(12) United States Patent
Worlitz

(10) Patent No.: US 8,840,185 B2
(45) Date of Patent: Sep. 23, 2014

(54) AUTOMOBILE SEAT WITH MASSAGING DEVICE

(75) Inventor: Claudia Worlitz, Hannover (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/554,046

(22) Filed: Jul. 20, 2012

(65) Prior Publication Data

US 2013/0020844 A1    Jan. 24, 2013

(30) Foreign Application Priority Data

Jul. 20, 2011 (DE) .......................... 10 2011 108 106

(51) Int. Cl.
A47C 7/40     (2006.01)
A47C 7/46     (2006.01)
A47C 7/62     (2006.01)

(52) U.S. Cl.
USPC ............... 297/284.1; 297/217.4; 297/396; 297/408; 297/410

(58) Field of Classification Search
USPC ............. 297/217.4, 284.1, 284.7, 391–410
See application file for complete search history.

(56) References Cited

U.S. PATENT DOCUMENTS

| | | | | |
|---|---|---|---|---|
| 4,574,786 A * | 3/1986 | Hashimoto et al. | 297/284.1 X |
| 4,693,515 A * | 9/1987 | Russo et al. | 297/284.1 X |
| 6,250,716 B1 * | 6/2001 | Clough | 297/408 |
| 6,467,846 B2 * | 10/2002 | Clough | 297/410 |
| 6,511,130 B2 * | 1/2003 | Dinkel et al. | 297/410 |
| 6,666,517 B2 * | 12/2003 | Clough | 297/410 |
| 7,040,705 B2 * | 5/2006 | Clough | 297/410 |
| 7,264,313 B2 * | 9/2007 | Clough | 297/409 X |
| 7,314,455 B1 * | 1/2008 | Hill | 297/391 X |
| 7,334,839 B1 * | 2/2008 | Malerba et al. | 297/217.3 X |
| 7,364,239 B2 * | 4/2008 | Clough | 297/391 |
| 7,727,171 B2 * | 6/2010 | Ozaki et al. | 297/284.3 X |
| 7,914,471 B2 * | 3/2011 | Chen | 601/99 |
| 8,011,729 B2 * | 9/2011 | Petzel et al. | 297/284.6 |
| 8,167,367 B1 * | 5/2012 | Martinez | 297/217.3 X |
| 8,342,607 B2 * | 1/2013 | Hofmann et al. | 297/284.6 X |
| 8,474,908 B2 * | 7/2013 | Petzel et al. | 297/284.3 |
| 8,573,700 B2 * | 11/2013 | Togura et al. | 297/391 |
| 2002/0190549 A1 * | 12/2002 | Chien-Chuan | 297/217.3 |
| 2003/0025366 A1 * | 2/2003 | Barreiro, Jr. | 297/217.3 |
| 2003/0038517 A1 * | 2/2003 | Moran et al. | 297/284.3 |
| 2004/0183345 A1 * | 9/2004 | Furuie et al. | 297/217.1 |
| 2008/0296939 A1 * | 12/2008 | Bajic et al. | 297/180.1 |
| 2009/0099490 A1 * | 4/2009 | Durt et al. | 297/284.3 X |
| 2009/0108654 A1 * | 4/2009 | Petzel et al. | 297/284.1 |
| 2010/0207431 A1 * | 8/2010 | Petzel et al. | 297/217.3 X |
| 2010/0225153 A1 * | 9/2010 | Togura et al. | 297/410 |
| 2010/0276973 A1 * | 11/2010 | Zenk et al. | 297/284.3 |
| 2010/0320819 A1 * | 12/2010 | Cohen et al. | 297/217.4 |

(Continued)

FOREIGN PATENT DOCUMENTS

| | | |
|---|---|---|
| DE | 10134405 | 1/2003 |
| DE | 102005030258 | 1/2007 |
| DE | 102010056198 | 8/2011 |

*Primary Examiner* — Rodney B White
(74) *Attorney, Agent, or Firm* — Bourque and Associates, PA

(57) ABSTRACT

An automobile seat with a massage device (3) with at least one massaging element (3a) to stimulate and/or massage the neck and/or shoulder area which includes a seat back (1) and a headrest (2). The massage device (3) is connected with the seat back (1) on its upper section (1a) facing the headrest (2), and may be adjusted relative to the seat back without having to adjust the headrest.

7 Claims, 3 Drawing Sheets

(56) References Cited

U.S. PATENT DOCUMENTS

2011/0084539 A1* 4/2011 Hofmann et al. ........ 297/452.48
2011/0285189 A1* 11/2011 Petzel et al. ............... 297/284.1
2013/0119716 A1* 5/2013 Stronconi .................. 297/180.1

* cited by examiner

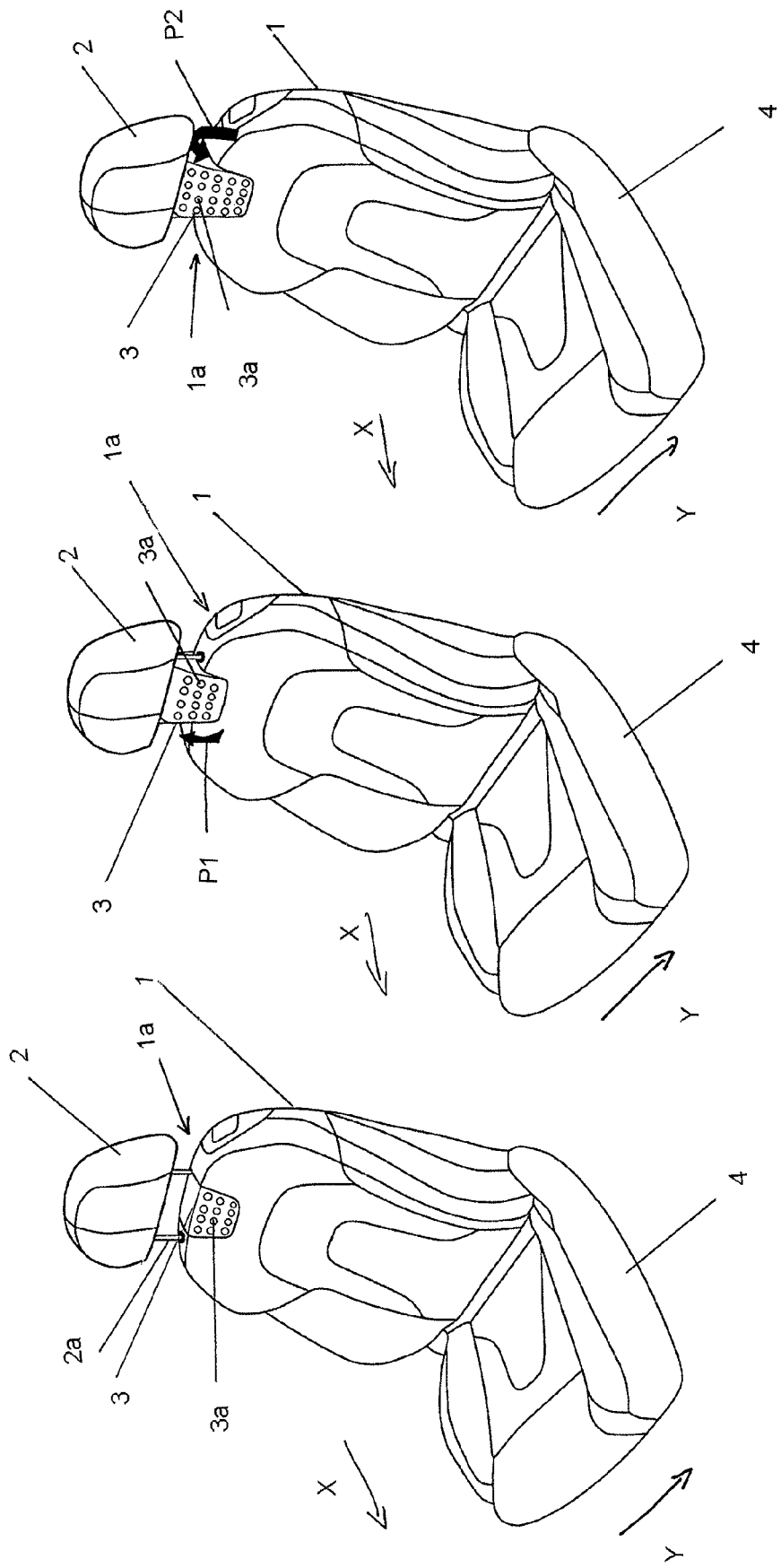

AUTOMOBILE SEAT WITH MASSAGING DEVICE

TECHNICAL FIELD

The invention relates to an automobile seat with a massage device that can be moved and positioned independent of the headrest.

BACKGROUND INFORMATION

Automobile seat with massage devices are known from DE 101 34 405 A1 and DE 10 2005 030 258 A1, for example.

In both cases, the massage device is provided on the headrest in order to provide the option to adjust the position of the massaging element individually based on the size of the passenger.

In DE 101 34 405 A1, a number of massaging elements is integrated into the headrest so that the height of the massage device perpendicular to the direction of travel may be adjusted along with the headrest. The massage device may thus be matched to the size of the passenger by adjusting the headrest.

It is known from DE 10 2005 030 258 A1 to move the massage device located on the headrest from a non-use position below the headrest forward into a use position. Again, the massage device may be matched to the size of the passenger by adjusting the headrest.

A disadvantage to these two systems is that the height of the headrest must be adjusted in order to adjust the height of the massage device. This limits the individual options for modification for the passenger since the height of the headrest alone can not be varied in an unlimited manner for safety reasons without sacrificing the original function of the headrest.

It is therefore the challenge of this invention to provide an automobile seat with a massage device of the above-mentioned type in which these disadvantages can be overcome.

SUMMARY

Based on the invention, a massage device is provided in the upper portion of the seat back, and is thus adjustable with the seat back. This integration into the seat back allows the massage device to be adjusted independently of the headrest. This in turn allows the massage device to be individually adjusted to various neck and shoulder areas of the passenger without the safety concerns associated with adjusting the headrest outside the tolerable range.

It is advantageously provided that the height of the massage device may be adjusted, i.e., it may be moved to the underside of the headrest and/or essentially perpendicular to the direction of travel. It may further be provided that the massage device also be adjusted along or in opposition to the direction of travel. And finally, it may be provided in an advantageous embodiment that the massage device pivot with respect to the seat back.

The invention thus allows a large number of adjustment options to the anatomy of the passenger, whereby it becomes possible to seperate the motions of the massage device and the headrest.

BRIEF DESCRIPTION OF THE DRAWINGS

In the following, the invention will be described in greater detail using Figures, which show:

FIG. 1 automobile seat in the first position based on the invention;

FIG. 2 automobile seat in the second position based on the invention;

FIG. 3 automobile seat in the third position based on the invention;

DETAILED DESCRIPTION OF THE PREFERRED EMBODIMENTS

Figure 4:
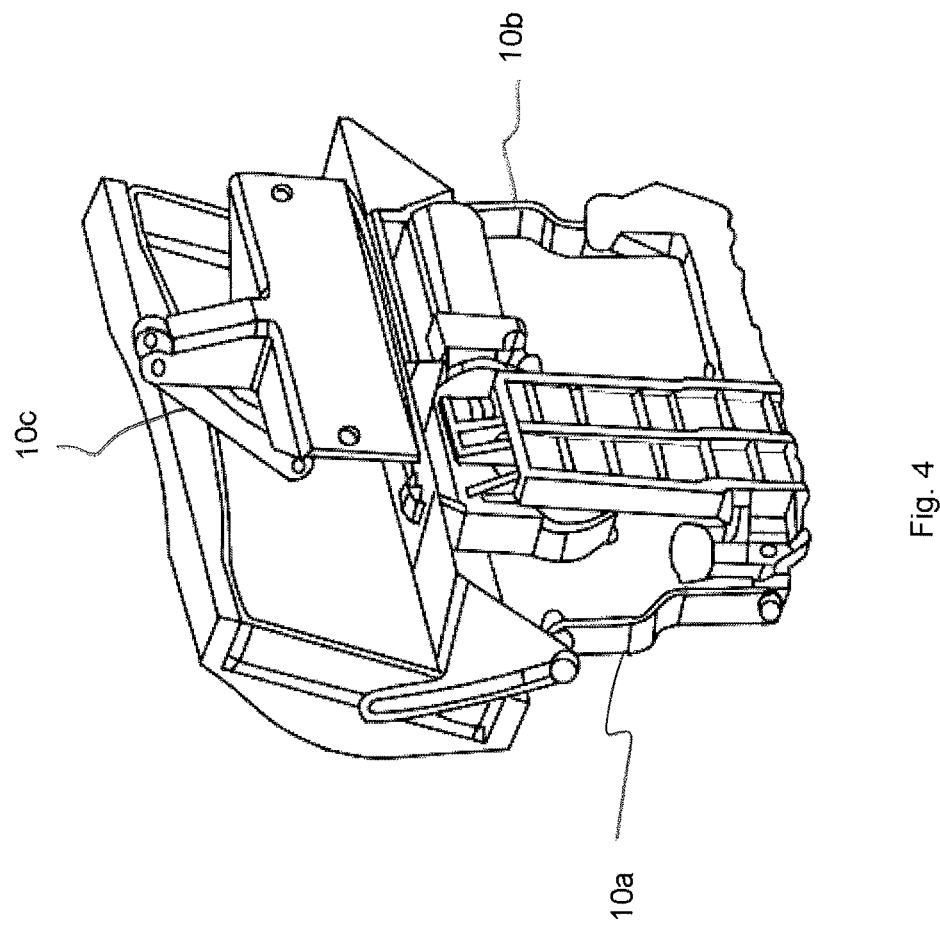
FIG. 4 is a schematic view of the headrest adjustment mechanism according to the invention.

The automobile seat shown in FIGS. 1 through 3 includes a seat back 1 that is connected in the conventional manner in its lower area with a seat base 4.

Further, the automobile seat includes a headrest 2 that is connected to the upper section 1a of the seat back 1 by means of supporting rods 2a. The headrest 2 is advantageously displaceable along the longitudinal extension of the seat back 1 (essentially vertical to the direction of travel X), so that it may be matched to the head height of the passenger.

A massage device 3 separate from the headrest 2 is mounted on the upper end section 1a of the seat back and includes several massaging elements 3a that may be electrically, pneumatically, hydraulically, or otherwise driven. The massage device 3 in the illustrated example is embedded into the upper side 1a of the seat back 1, and is connected with the seat back 1. The massage device 3 may thus be adjusted with respect to the seat back 1.

FIG. 1 shows a first position in which the massage device 3 is shown in a non-displaced non-use position. As FIG. 2 shows, the massage device 3 may be displaced vertically in the direction of the arrow P1 (essentially vertical to the direction of travel X) toward the underside of the headrest 2. This may occur independently of any displacement of the headrest 2 so that a matching of the effective zone, i.e., the contact points of one or more massaging elements 3a to the neck or shoulder area may be performed without adjusting the headrest 2 along with it. Along with this vertical displacement, it may be provided that adjustment or displacement of the massage device 3 may also occur at least essentially along and/or opposite to the direction of travel X, and as necessary along a direction Y crosswise to the direction of travel X, and advantageously also roughly perpendicular to direction P1.

Further, as FIG. 3 shows, the massage device 3 may also be tilted or pivoted along and/or opposite to the direction of travel X (arrow P2). It is thus possible to address specifically-targeted areas of the passenger's neck with the massage device 3. Generally, the massage device 3 may be connected to the seat back by means of links that allow the massage device to tilt and move up and down. Right movement may also be achieved by using additional guide rails (shown generally at 10a-10c in FIG. 4 and well known in the art) or the like. Accordingly, motion in all directions may be performed independently from each other thus vertical, horizontal and tilting motion may be provided.

Figure 5:
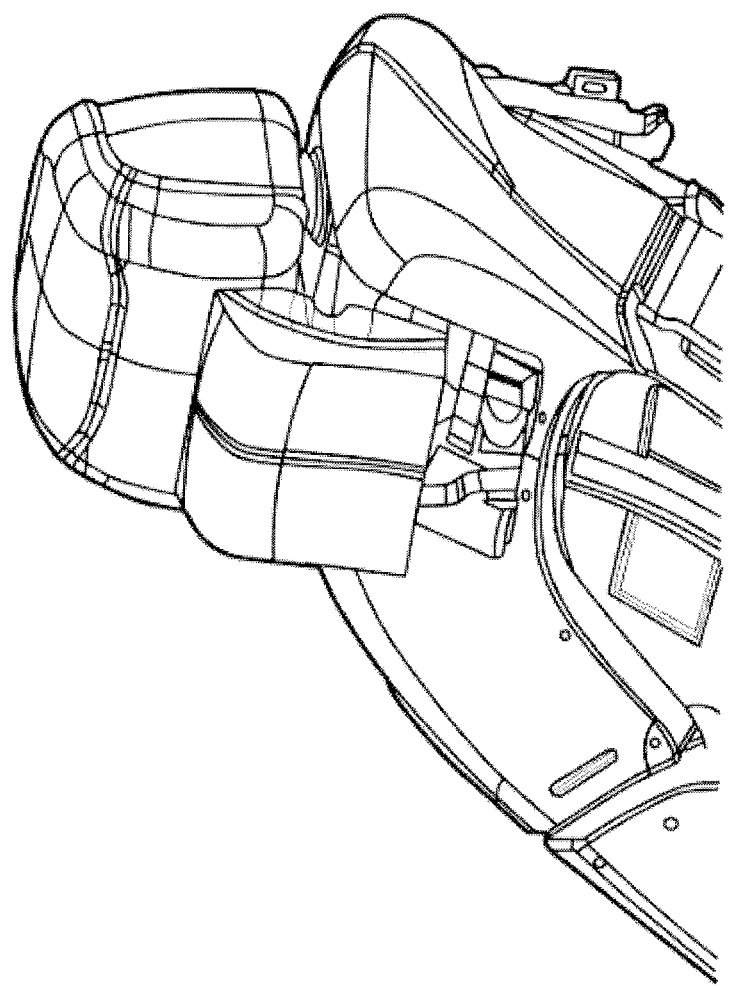
FIG. 5 is a front view of the adjustable massager in place in a seat back according to the invention.

The massage device 3 may be guided in an arch shaped slopped slide guide. The shape of the guide determines the path the massage device travels in the X and Z direction. Preferably, a combined X and Z direction goes along with a tilting motion of the massage device 3. The guides 10 are shaped such that depending on the size of the person sitting in the seat, the optimum position for neck massage can be achieved. Depending on the size of the person, optimum positions and tilting angles of the massage device with respect to the person's neck and body may be achieved. See. FIG. 5. This may be achieved by providing a combination of links and/or guides that will allow the massage device to 3 travel in a predetermined or unlimited path and trajectory.

All motions of the massage device are thus completely independent of the adjustment and position of the headrest 2 so that a compromise with regard to the safety functions of the headrest does not occur upon adjustment of the massage device 3.

In contrast to known solutions, the variability of the massage device for the passenger's shoulder and neck areas is greatly increased by the invention, whereby particularly the position and the intensity of massage to the body may be adjusted based on the mobility of the massage device.

Modifications and substitutions by one of ordinary skill in the art are considered to be within the scope of the present invention, which is not to be limited except by the following claims.

The invention claimed is:

1. An automobile seat with a massage device (3) having at least one massaging element (3a) to stimulate and/or massage the neck and/or shoulder area, said automobile seat including a seat base (4) to which is coupled a seat back (1) and a headrest (2) disposed proximate an upper section (1a) of said seat back (1), wherein the massage device (3) is disposed within and connected with the seat back (1) proximate its upper section (1a) facing the headrest (2), and wherein said message device (3) may be adjusted relative to the seat back (1) independent of adjustment of the headrest (2) and the seat back (1), and wherein the at least one messaging element (3a) includes at least one active messaging element (3a), said at least one active messaging element (3a) including a mechanically operated active messaging element (3).

2. The automobile seat as in claim 1, wherein the massage device (3) may be moved so to protrude from the upper section (1a) of the seat back (1).

3. The automobile seat as in claim 1, wherein the massage device (3) may be displaced with respect to the seat back (1) at least along one direction (P1) generally perpendicular to a direction of travel (X) of the automobile seat.

4. The automobile seat as in claim 3, wherein the massage device (3) may also be displaced in a tilted or pivoted manner with respect to the seat back (1) along a second direction (P2) and along and/or opposite to the direction of travel (X) of the automobile seat.

5. The automobile seat as in claim 1, wherein the massage device (3) may be pivoted with respect to the seat back (1).

6. The automobile seat as in claim 1, wherein the massage device (3) is adjustable, particularly displaceable, along a direction of travel (X) of the automobile seat and/or at least generally along a direction (Y) generally transverse to the direction of travel (X) of the automobile seat.

7. An automobile seat with a massage device (3) having at least one massaging element (3a) to stimulate and/or massage the neck and/or shoulder area, said automobile seat including a seat base (4) to which is coupled a seat back (1) and a headrest (2) disposed proximate an upper section (1a) of said seat back (1) wherein the massage device (3) is connected with the seat back (1) proximate its upper section (1a) facing the headrest (2), wherein the massage device (3) may be displaced with respect to the seat back (1) at least along one direction (P1) generally perpendicular to a direction of travel (X) of the automobile seat and wherein said massage device (3) may also be displaced in a tilted or pivoted manner with respect to the seat back (1) along and/or opposite to the direction of travel (X) of the automobile seat along a second direction (P2), and further wherein the massage device (3) is adjustable, particularly displaceable, along a direction of travel (X) of the automobile seat and/or at least generally along a direction (Y) generally transverse to the direction of travel (X) of the automobile seat, and wherein said massage device (3) may be adjusted relative to the seat back (1) independent of adjustment of the headrest (2) and the seat back (1), wherein the at least one massaging element (3a) includes at least one active massaging element (3a).

* * * * *